United States Patent

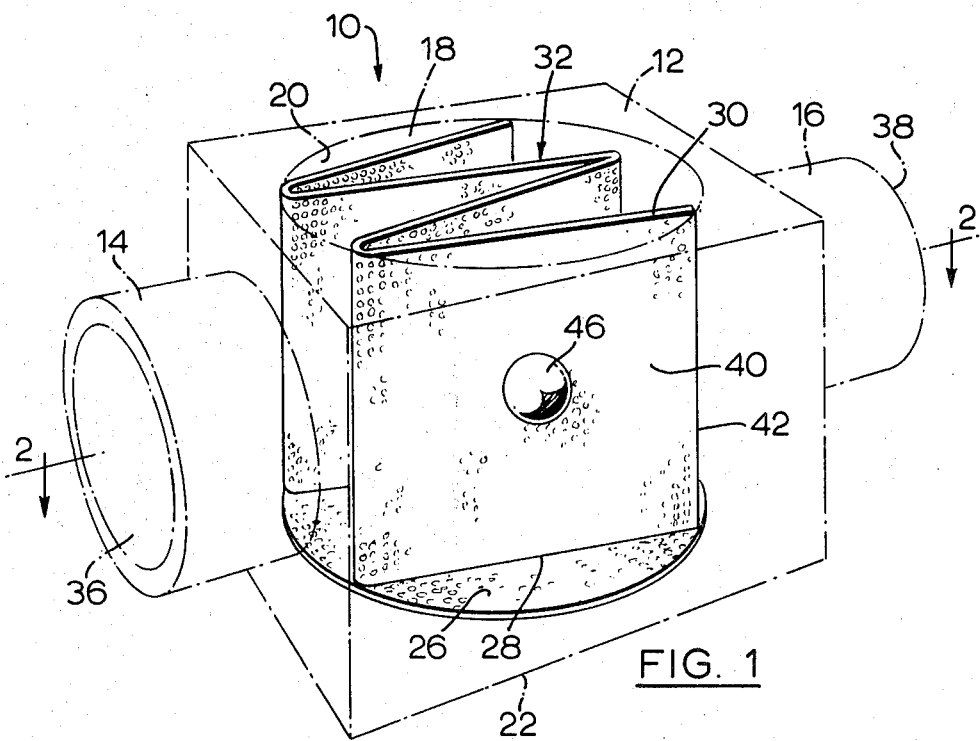
FIG. 1
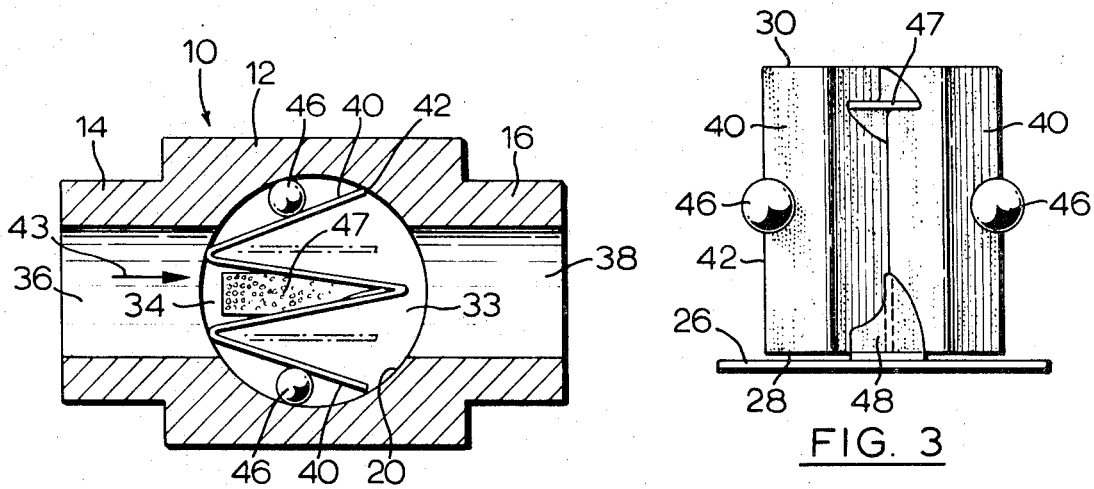
FIG. 2
FIG. 3
*INVENTOR.*
WERNER P. E. HUEBNER
BY *Arne J. Fors*
Agent

[11] 3,556,298

[72] Inventor Werner P. E. Huebner
 6 Sweetbriar Court, Toronto, 16, Ontario, Canada
[21] Appl. No. 844,142
[22] Filed July 23, 1969
[45] Patented Jan. 19, 1971
[32] Priority July 24, 1968
[33] Canada
[31] 025,836

[54] V-SHAPED FILTER ELEMENT BYPASS MEANS
 7 Claims, 7 Drawing Figs.
[52] U.S. Cl. .................................................. 210/131,
 55/313, 210/310, 210/447, 210/493
[51] Int. Cl. ........................................................ B01d 35/14

[50] Field of Search.................................................. 210/131,
 446, 447, 310, 356, 493; 55/309, 312, 313, 314

[56] References Cited
UNITED STATES PATENTS
2,151,538 3/1939 Swanson........................ 210/131
3,190,057 6/1965 Sinex............................ 210/447X Primary Examiner—Frank A. Spear, Jr.
Attorneys—Arne I. Fors, Frank I. Piper and James T. Wilbur ABSTRACT: A strainer for removing solids from a flowing fluid comprising a V- or zigzag-shaped elongated screen disposed in an elongated cylindrical chamber and adapted to yield under high fluid pressures.

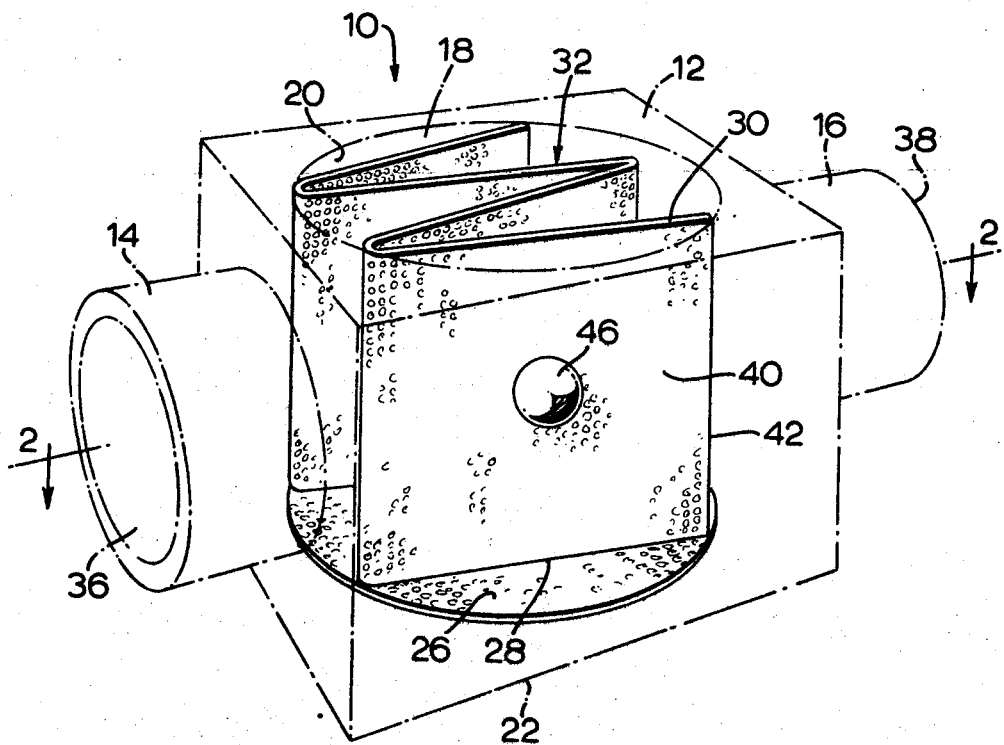

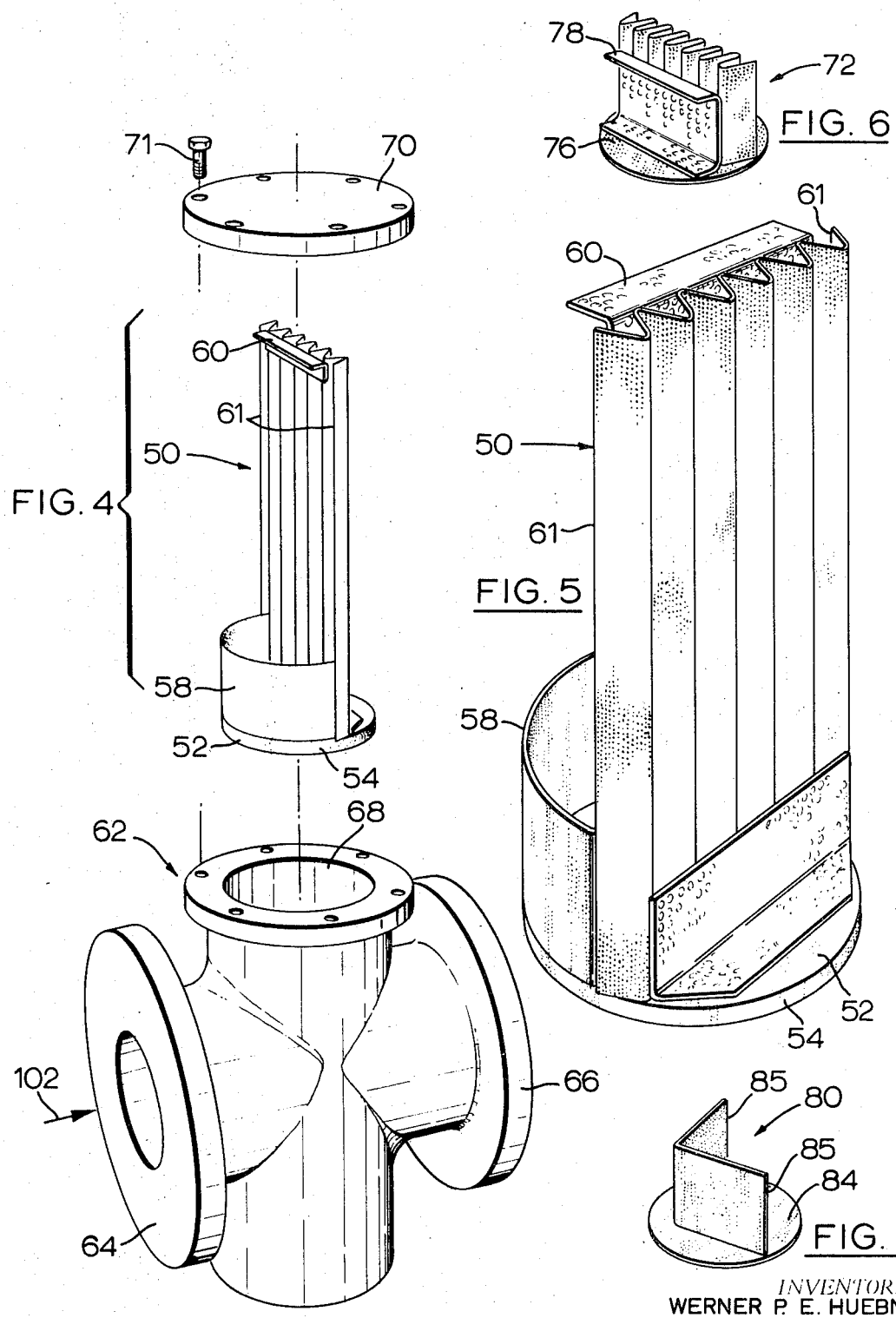

V-SHAPED FILTER ELEMENT BYPASS MEANS

This invention relates to straining devices and is more particularly directed to an apparatus for removing foreign matter from fluid flowing conduits.

It is a common expedient for removing undesirable foreign matter from fluids to employ strainers positioned in the flow line of conduits. Such strainers frequently comprise elliptical casing chambers having inlet and outlet passages and cylindrical screens positioned within the casing and disposed transverse to or at an acute angle to the direction of fluid flow. Where substantial amounts of foreign matter are being carried in the fluid, however, matter entrained on the screen prevents the free passage of fluid through the casing causing high pressure drops or may block the flow completely. A partial or complete blockage can seriously disrupt a hydraulic or other system and equipment may be damaged by the high upstream pressures resulting from the blockage, or through starvation on the downstream side.

It is accordingly a principal object of the invention to provide a strainer having a large screen area which permits a straight-through fluid flow to minimize pressure drops due to friction and turbulence, created by drastic and repeated changes in direction brought about by screen and body configuration.

It is another object of the invention to provide a strainer screen which yields or collapses when the pressure differential across the screen reaches a predetermined amount, thereby permitting solids, liquids or gases to bypass the screen to obviate excessive upstream pressures.

It is another object to provide a screen which, when rotated 180° from the position in which yieldable straining occurs, provides a nonyieldable positive straining action.

It is a further object to provide a screen having a basket associated therewith, the basket providing a receptacle for foreign matter trapped by the screen.

And a further object of the invention is the provision of a strainer structure which is simple in construction and compact in size.

And a still further object is to provide a strainer screen which may be easily removed from the casing for cleaning or replacement.

SUMMARY OF THE INVENTION

These objects may be achieved by providing a strainer for the removal of solid particles in a flowing fluid comprising a casing having a chamber with a generally cylindrical inner wall and a wall at each end of the cylindrical wall, a pair of passages in the cylindrical wall, and a screen having a V-section with the included angle less than 90° positioned within the chamber intermediate said passages having faces defining a first and second compartment, each passage communicating with one of said compartments, the screen having terminal edges abutting the end walls of the chamber and side edges contiguous with and abutting the cylindrical wall, each side edge adapted to be urged away from the cylindrical wall when the pressure acting on the side of the screen defining the first compartment exceeds by a predetermined amount the pressure acting on the side defining the second compartment and to be urged into abutment with the cylindrical wall when the flow pressure acting on the face of the screen defining the second compartment exceeds the pressure acting on the side of the screen defining the first compartment.

BRIEF DESCRIPTION OF THE DRAWINGS

A fuller understanding of the invention may be had by referring to the following description and claims taken in conjunction with the accompanying drawings, in which:

FIG. 1 is a perspective view of an embodiment of the strainer of the invention showing the casing in ghost lines;

FIG. 2 is a sectional view taken along the line 2—2 in FIG. 1;

FIG. 3 is a front elevational view of the screen illustrated in FIG. 1;

FIG. 4 is an exploded perspective view of a second embodiment of the invention;

FIG. 5 is another perspective view of the screen shown in FIG. 4; and

FIGS. 6 and 7 are perspective views of further embodiments of the strainer screen.

Like reference characters refer to like parts throughout the description of the drawings.

DESCRIPTION OF THE PREFERRED EMBODIMENT

With reference to FIGS. 1, 2 and 3, the strainer indicated generally by the numeral 10 is composed of casing 12, internally threaded sleeves 14 and 16 and screen 32. Chamber 18 within casing 12 is generally cylindrical in shape and is bounded by cylindrical wall 20, lower end wall 22 and an upper end wall (not shown). Lower end wall 22 normally is a permanent part of or is permanently secured to casing 12 whereas the upper end wall is removably secured to casing 12. As shown, chamber 18 is exposed when the upper end wall is removed.

Screen 32 is W in shape and is fastened to circular portion 26 and disposed normal thereto. The diameter of circular portion 26 is slightly less than the diameter of chamber 18. Both screen 32 and circular portion 26 preferably are constructed of perforated resilient material. Screen 32 has outer faces 40, side edges 42 and lower and upper terminal edges 28 and 30 respectively. Side edges 42 are contiguous with, but do not rigidly abut cylindrical wall 20 and lower end wall 22 abuts circular portion 26. No matter how screen 32 is oriented within chamber 18, side edges 42 will be contiguous with cylindrical wall 20 and produce a seal when required, as explained below.

In position, circular portion 26 abuts lower end wall 22 and upper terminal edge 30 abuts the upper end wall. Screen 32 divides chamber 18 into two compartments 33 and 34, as shown in FIG. 2. Passage 36 within sleeve 14 communicates with compartment 34 and passage 38 within sleeve 16 communicates with compartment 33. Screen 32 may be readily inserted into and removed from chamber 18 when the upper end wall is removed. Spheres 46 may be fastened to screen 32 approximately midway between lower and upper terminal edges 28 and 30 for additional support.

In operation, when a flow of fluid and solids is in the direction indicated by arrow 43, it will be seen that as solids build up on the side of screen 32 defining first compartment 34, the pressure within compartment 34 will increase relative to the pressure within compartment 33. When the pressure differential reaches a certain amount, side edges 42 will be urged toward each other by the resolution of forces acting on the screen, thereby permitting the flow of solids and fluid to bypass screen 32 between wall 20 and side edges 42. It will be evident that the pressure differential required to move side edges 42 out of abutment with wall 20 will vary according to resistance afforded to such movement by screen 32. Thus any desired pressure differential required to collapse screen 32 can be achieved by appropriate choice of materials and dimensions for screen 32 of by the manner in which screen 32 is reinforced.

When the flow of solids and fluid is in the opposite direction, it will be observed that a positive straining action will be achieved, inasmuch as the pressure differential between compartments 33 and 34 will urge side edges 42 into firm abutting contact with wall 20. Spheres 46 are provided to prevent outer faces 40 from excessive bowing under the pressure differential.

Thus, according to the orientation of screen 32 with respect to the flow, screen 32 provides a positive straining action or a yieldable straining action as is desired for a particular installation. Inasmuch as screen 32 merely rests within chamber 18, screen 32 may be readily rotated to provide the required straining action.

When the upper end wall is unfastened, screen 32 can be readily removed from chamber 18 for cleaning. It will be evident that loose sediment trapped by screen 32 will be removed from chamber 18 by circular portion 26.

As illustrated more particularly in FIGS. 2 and 3, screen 22 may be reinforced by tabs 47 and 48. When screen 32 is positioned as shown in FIGS. 1 and 2, yieldable straining action is provided to flow travelling in the direction indicated by arrow 43. When screen 32 is rotated 180°, a positive straining action is achieved.

FIGS. 4 and 5 illustrate a further embodiment of a strainer according to the invention wherein the area of the screen is much larger than the area of screen 32 illustrated in FIGS. 1 to 3 with respect to the internal cross-sectional area of the connecting conduits. Screen 50 is zigzag in shape and is fastened to circular portion 52 and disposed normal thereto. Fastened to circular portion 52 at one side thereof is collar 54 and to the other side is semicylindrical portion 58. It will be seen that semicylindrical portion 58, screen 50 and circular portion 52 form a receptacle or basket for solids trapped by screen 50. In order to reinforce screen 50 to withstand the velocity and pressure drop across it, angle portions may be fastened at one or both ends. One such angle portion is illustrated in FIG. 4 and numbered 60. Said angle portion 60 may be used as a handle to remove screen 50 from casing 62 for cleaning or replacement.

T-shaped casing 62 in which screen 50 is removably positioned in composed of flanged passages 64 and 66, generally circular chamber 68 and cover 70. Cover 70 is removably fastened to casing 62 by means of bolts, one of which is shown and numbered 71.

It will be seen that if screen 50 is oriented within casing 62 as shown in FIG. 4, screen 50 will provide a positive straining action to flow in the direction indicated by arrow 102 due to lateral screen edges 61 projecting beyond collar 54 and being pressed against the cylindrical wall of the casing chamber 68 by the pressure differential across the screen. Sediment trapped by screen 50 will collect in the basket formed by semicircular portion 58, screen 50 and circular portion 52 and removal of the sediment can be easily accomplished by removing cover 70 and lifting screen 50 from casing 62. Rotation of screen 50 through 180° relative to the flow results in edges 61 being pressed against the chamber sidewall by their resilience until the pressure differential across the screen should become sufficiently great to overcome the resistance of the screen edges to deformation.

FIGS. 6 and 7 illustrate further embodiments of a screen according to the invention. In FIG. 6, screen 72 is generally zigzag in shape and is fastened to circular portion 76 and reinforcing channel-shaped portion 78. In FIG. 7, screen 80 is V-shaped having an included angle of less than 90° and is fastened to and normal to circular base portion 84. It will be evident that insertion of screen 80 within a cylindrical chamber such as shown in FIG. 1 such that edges 85 resiliently abut the sidewall of the chamber and the apex of the screen is upstream will result in a straining action being effected on liquid passing through the screen until the pressure differential across the screen exceeds the screen yield strength, causing the screen edges 85 to deform inwardly and permitting liquid to flow between the screen and chamber sidewall. Rotation of the screen 180° relative to the flow results in positive straining of the liquid since screen edges 85 are continually pressed against the chamber sidewall at all positive pressure differentials across the screen.

To allow greater tolerances in manufacturing the screen and to prevent any solids bypassing the screen, a rubber compound or a disc of other synthetic material can be cemented or otherwise fixed to the end walls. When the material of which the screen is made is too inflexible to contact the wall of the chamber, a thin strip may be fastened to the side edges of the screen. It will be understood that the strainer according to the invention may be oriented in any direction. For example, circular portion 26 illustrated in FIGS. 1 to 3 may be above or below the removable upper end wall of the strainer or on the same level. The basket shown in FIG. 4 naturally is less effective when not in an upright position; however, the bypass feature of screen 50 is not impaired when screen 50 is oriented other than shown in FIG. 4.

The passages which communicate the conduits to the casing chamber need not be circular but may be oval, square, rectangular or shaped otherwise for engineering reasons. The passages can and on some designs must be tapered especially where the strainer is cast or forged.

It has been found equally suitable to manufacture the screen from ferrous, nonferrous or synthetic material. The screen may be made from continuous perforated sheets or may be woven. In addition, the openings in the screen may be of any size or shape. The casing may be made of yellow brass, steel, stainless steel or from a variety of other metals or synthetic materials.

It will be understood, of course, that further modifications can be made in the embodiments of the invention described and illustrated herein without departing from the scope and purview of the appended claims.

I claim:

1. A strainer for the removal of solid particles in a flowing fluid comprising a casing having a chamber with a generally cylindrical inner wall and a wall at each end of the cylindrical wall, a pair of passages in the cylindrical wall, and a screen having a V-section with the included angle less than 90° positioned within the chamber intermediate said passages having faces defining a first and second compartment, each passage communicating with one of said compartments, the screen having terminal edges abutting the end walls of the chamber and side edges contiguous with and abutting the cylindrical wall, each side edge adapted to be urged away from the cylindrical wall when the pressure acting on the side of the screen defining the first compartment exceeds by a predetermined amount the pressure acting on the side defining the second compartment and to be urged into abutment with the cylindrical wall when the flow pressure acting on the face of the screen defining the second compartment exceeds the pressure acting on the side of the screen defining the first compartment.

2. A strainer as claimed in claim 1 wherein said screen has at least two limbs formed in the shape of a V.

3. A strainer as claimed in claim 1 in which said fluid is a liquid.

4. A strainer as claimed in claim 1 wherein a basket is fastened to said screen at one end thereof and is adapted to receive solid particles trapped by said screen.

5. A strainer as claimed in claim 4 in which said fluid is a liquid.

6. A strainer for the removal of solid particles from a flowing liquid comprising a casing having a chamber with a generally cylindrical inner wall and a wall at each end of the cylindrical wall, a pair of passages in the cylindrical wall, and a screen having a V-section with the included angle less than 90° positioned within the chamber intermediate said passages having faces defining a first and second compartment, each passage communicating with one of said compartments, the screen having terminal edges abutting the end walls of the chamber and side edges contiguous with and abutting the cylindrical wall, the apex of the screen being disposed to face upstream such that each side edge remains in abutment with the cylindrical wall until the flow pressure acting on the face of the screen defining the first compartment exceeds the pressure acting on the face of the screen defining the second compartment by a predetermined amount whereby the screen side edges are urged away from the cylindrical wall.

7. A strainer as claimed in claim 6 in which said screen has a zigzag cross section adapted to be positioned in said chamber in tight-fitting relation such that the sides of the screen yieldingly abut the sidewall and the ends of the screen abut the closure means whereby the chamber is divided into a pair of compartments, inlet and outlet passages formed in the sidewall so disposed that the inlet is in communication with one compartment and the outlet is in communication with the other compartment, a basket formed at one end of the screen for receiving solids, and a reinforcing crosspiece formed at the other end of the screen.